(12) United States Patent
Kalm

(10) Patent No.: US 6,481,564 B2
(45) Date of Patent: Nov. 19, 2002

(54) CONVEYOR SIDE FRAME SHAFT OPENING RECONDITIONING DEVICE AND METHOD

(75) Inventor: W. Scott Kalm, Plano, TX (US)

(73) Assignee: Kalm-Forsythe Global Innovations, Inc., Plano, TX (US)

( * ) Notice: Subject to any disclaimer, the term of this patent is extended or adjusted under 35 U.S.C. 154(b) by 26 days.

(21) Appl. No.: 09/773,683

(22) Filed: Jan. 31, 2001

(65) Prior Publication Data

US 2002/0100662 A1 Aug. 1, 2002

(51) Int. Cl.[7] .................. B65G 47/00; B65G 13/02; B65G 13/12
(52) U.S. Cl. ................ 198/617; 198/782; 193/35 R
(58) Field of Search .................. 198/782, 370.04, 198/617; 193/35 SS, 35 J, 35 C, 35 R, 37

(56) References Cited

U.S. PATENT DOCUMENTS

| | | | | |
|---|---|---|---|---|
| 4,422,543 A | * | 12/1983 | Stubbings | 193/35 C |
| 5,657,854 A | * | 8/1997 | Chen et al. | 193/35 R |
| 6,112,875 A | | 9/2000 | Gibson | 193/35 R |
| 6,161,681 A | * | 12/2000 | Kalm | 198/781.1 |
| 6,367,617 B1 | * | 4/2002 | Schiesser et al. | 198/370.04 |

\* cited by examiner

*Primary Examiner*—Christopher P. Ellis
*Assistant Examiner*—Gene O. Crawford
(74) *Attorney, Agent, or Firm*—Jenkens & Gilchrist, P.C.

(57) ABSTRACT

A shaft capturing device useful for reconditioning worn roller conveyor side frame openings has a shape tapered to narrow in its depth dimension from a base portion toward a flange portion. An opening in the flange portion is sized to receive a roller conveyor shaft. A mounting opening located in the base portion accepts a mounting screw that when tightened pushes against and engages the roller conveyor side frame causing the base portion to move away from the side frame and the opening in the flange portion to close in size to tighten around the received shaft. As an enhancement, a slot may be included passing through the flange portion shaft receiving opening to define a pair of clamping tangs. An opening extending through the tangs accepts a screw that when tightened pulls the tangs together to clamp the flange portion around the received shaft. The mounting screw may then be tightened to further tighten the shaft and engage the roller conveyor side frame. In the event that multiple adjacent side frame openings are in need of repair, the device may include multiple shaft receiving openings spaced apart with a pitch substantially matching that of the side frame openings.

23 Claims, 2 Drawing Sheets

CONVEYOR SIDE FRAME SHAFT OPENING RECONDITIONING DEVICE AND METHOD

CROSS-REFERENCE TO RELATED PATENT

This application for patent is related to U.S. Pat. No. 6,161,681, by W. Scott Kalm, dated Dec. 19, 2000, the disclosure of which is hereby incorporated by reference.

BACKGROUND OF THE INVENTION

1. Technical Field of the Invention

The present invention relates to a method and apparatus for reconditioning worn openings in roller conveyor side frames.

2. Description of Related Art

Roller conveyor systems typically mount a series of conveyor rollers between two parallel, longitudinally extending, side frames. The rollers comprise an outer tubular covering with a bearing mounted shaft (axle) running through the middle of the roller and extending out past each roller end by several inches. Holes, slots, apertures or cut-outs (generally referred to as openings) are provided in each side frame, and the extending ends of the conveyor roller shafts are inserted in, and retained by, opposed pairs of such openings in the parallel side frames. The rollers may then be actuated through an appropriately configured drive system (such as a motor driven belt or chain drive).

When a roller conveyor has been in use for a number of years, the side frame openings which receive and retain the conveyor roller shafts (axles) can become distorted. Repetitive back and forth actuation of the conveyor roller causes the shaft of the roller to twist back and forth in the shaft opening of the side frame. Over a period of time, this twisting action tends to wear away at or distort the shape of the shaft opening. For example, with hexagonal shaft openings and correspondingly shaped conveyor roller shafts, the twisting action will, over time, turn the hexagonally shaped opening into a circularly shaped opening. It is also possible, although less likely, for such wear to turn a hexagonally shaped shaft into a round shaft. In either case, at this point, the shaft is free to rotate or spin within the opening which adversely affects conveyor operation.

This problem, however, is not the only concern experienced with such wear. As the hexagonal opening initially begins to wear, this allows for more movement (twisting) of the shaft which results in an increased noise level (rattling) caused by metal-to-metal contact of the shaft against the frame. This contact further increases the vibration effects experienced with operation of the roller conveyor, with the increased vibration possibly leading to premature failure of other conveyor components.

The most common solution to this problem is, unfortunately, an expensive and inconvenient solution. In many situations the side frames of the roller conveyor system must be replaced. Additionally, it is recognized that side frame failures of the kind discussed above, along with the resulting collateral adverse vibratory effects of such failures, may necessitate complete replacement of the roller conveyor system. It is still further recognized that many businesses which utilize and rely on conveyor systems cannot afford the downtime typically associated with large scale conveyor repair or replacement tasks. Thus, given the significant capital expenditures involved in purchasing and installing roller conveyor systems, and further recognizing the large number of such systems already installed and in continuous operation, there is a need for a quick, easy and inexpensive device and method for reconditioning and/or repairing conveyor side frames to retain roller conveyor shafts.

SUMMARY OF THE INVENTION

A shaft capturing device useful for reconditioning worn roller conveyor side frame openings includes a base portion and a flange portion. An opening in the flange portion is sized to receive a roller conveyor shaft. A mounting opening located in the base portion accepts a mounting screw that when tightened pushes against and engages the roller conveyor side frame causing the base portion to move away from the side frame and the opening in the flange portion closes in size to tighten around the received shaft.

In an embodiment of the invention, the device is shaped to taper and narrow in its depth dimension from the base portion toward the flange portion.

In another embodiment of the invention, a slot is formed passing through the flange portion shaft receiving opening to define a pair of clamping tangs. An opening extending through the tangs accepts a screw that when tightened pulls the tangs together to clamp the tangs of flange portion to the received shaft.

In yet another embodiment of the invention, the flange portion includes multiple shaft receiving openings spaced apart with a pitch substantially matching that of plural adjacent openings located in the conveyor side frame.

In yet another embodiment, the shaft capturing device may be used on new (or newer) roller conveyors in an effort to prevent wear or allow for incompatibly sized and/or shaped side frame openings and roller shafts to be used.

In yet another embodiment, a friction device may be included in with the shaft receiving opening to further restra against efforts to axially displace the device from the roller shaft.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
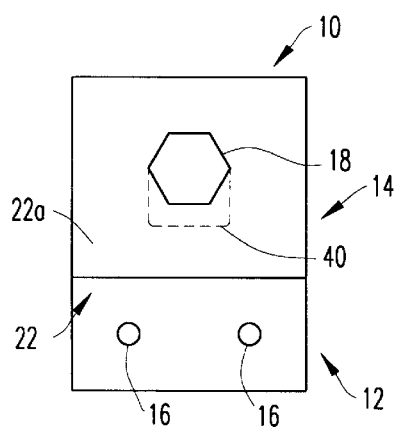
FIG. 1 is a front view of a shaft capturing device in accordance with the present invention.
Figure 2:
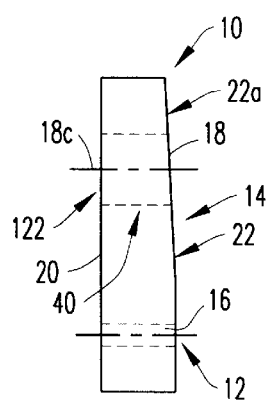
FIG. 2 is a side view of the shaft capturing device in accordance with the present invention.
Figure 3:
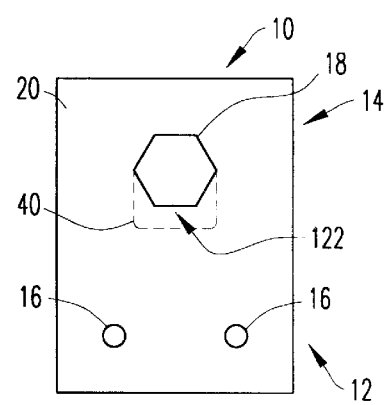
FIG. 3 is a rear view of the shaft capturing device in accordance with the present invention.

Reference is now made to FIGS. 1–3 wherein there are shown front, side and rear views, respectively, of a shaft capturing device 10 in accordance with the present invention. The device 10 is preferably manufactured from a resilient material such as a hardened or vulcanized rubber, engineering thermoplastic (such as, polyurethane, polyester, polycarbonate, polyolefin, nylon, styrene block copolymer, blends thereof, and the like), a metal or some other reinforced composite material (such as, for example, fiberglass, a polymer/chopped fiber composite, resin/fiber laminate, and the like). In a preferred embodiment, the device is manufactured of a toughened polyurethane material (for example, a polyurethane/elastomer blend) which, for example, may comprise the Brandonite 6689 material obtained from Globe Rubber Works of 254 Beech Street, Rockland, Mass. The device may be machined or otherwise fabricated, but is preferably molded in order to ease manufacture and reduce the per component cost for manufacture. As an alternative, it is recognized that the device may be manufactured from a rigid material such as hardened steel. Some benefits, however, accrue from the use of the resilient materials described above including better noise reduction, static electricity dissipation, and lower manufacturing cost.

The device 10 is unitary in nature and has a base portion 12 and a flange portion 14. In the base portion 12 are located a pair of mounting openings 16 (extending through the narrow dimension of the device) that are sized, shaped and tapped to accept a pair of threaded mounting screws (not shown). In the flange portion 14 is located a roller conveyor shaft receiving opening 18 (also extending through the narrow dimension of the device) that is sized and shaped very slightly larger than the size and shape of the roller conveyor shaft (not shown) to be captured therein. Although this opening 18 is illustrated as having a hexagonal shape, it will, of course, be understood that the opening may have any suitable shape including round, oval, D-shaped, and the like, as is commonly experienced in the industry, and it need not, in order for the device to work, necessarily have the same size and shape as the to be captured shaft. The openings 14 and 16 for the device 10 are oriented such that they extend through the device in a substantially perpendicular manner with respect to a rear face 20 of the device. The device 10 further includes a front face 22 that, at least with respect to a portion thereof located at and about the flange portion 14, forms a taper 22a that narrows the device in its depth dimension (i.e., the front face surface in this region is not oriented parallel with respect to the rear face 20). In this configuration, the roller conveyor shaft receiving opening 18 is oriented at an oblique angle with respect to the tapered portion 22a of the front face 22. This tapered portion 22a of the front face 22 is best seen in FIG. 2 where the extent of the taper 22a is illustrated in a slightly exaggerated manner. Although any angle, including that illustrated, may be chosen, the angle of the taper 22a is preferably chosen in the range of between one to five degrees.

Although a pair of openings 16 are illustrated, it will be understood that only one such opening 16 is necessary. Two openings 16 (with their associated screws) provide for improved engagement of the device against a conveyor side frame and improved leverage (as will be described herein).

At a lower portion of the shaft receiving opening 18, it may be advantageous to include a friction material 40 (illustrated generally speaking with dotted lines). The purpose of this material 40 is to act and provide a further restraint against axial displacement of the received shaft from the opening 18. One example of such a friction material 40 may comprise a thin piece of metal molded into the device. Another example may comprise one or more rubber fingers molded into the edges of the opening 18. Yet another example may comprise a roughening of the inner surfaces of the opening 18. Other options readily recognized by those skilled in the art for providing some sort of friction restraint against axial shaft displacement may also be used. Whatever material is used, however, should not interfere with the insertion of the shaft into the opening 18.

Figure 4:
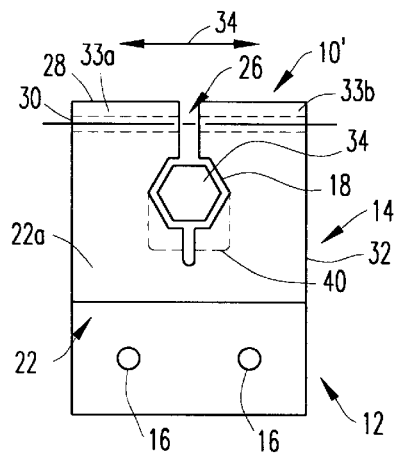
FIG. 4 is a front view of an alternative embodiment shaft capturing device in accordance with the present invention.
Figure 5:
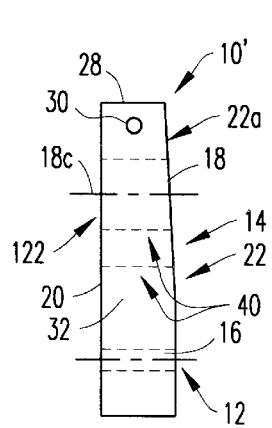
FIG. 5 is a side view of the alternative embodiment shaft capturing device in accordance with the present invention.
Figure 6:
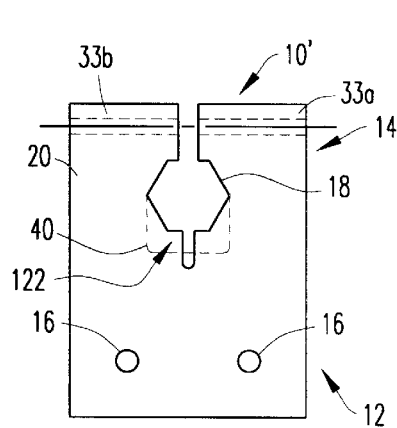
FIG. 6 is a rear view of the alternative embodiment shaft capturing device in accordance with the present invention.

Reference is now made to FIGS. 4–6 wherein there are shown front, side and rear views, respectively, of an alternative embodiment shaft capturing device 10' in accordance with the present invention. The device 10 is preferably manufactured from a resilient material such as a hardened or vulcanized rubber, engineering thermoplastic (such as, for example, polyurethane, polyester, polycarbonate, polyolefin, nylon, styrene block copolymer, blends thereof, and the like), a metal or some other reinforced composite material (such as, fiberglass, a polymer/chopped fiber composite, resin/fiber laminate, and the like). In a preferred embodiment, the device is manufactured of a toughened polyurethane material (for example, a polyurethane/elastomer blend) which, for example, may comprise the Brandonite 6689 material obtained from Globe Rubber Works of 254 Beech Street, Rockland, Mass. The device may be machined or otherwise fabricated, but is preferably molded in order to ease manufacture and reduce the per component cost for manufacture. As an alternative, it is recognized that the device may be manufactured from a rigid material such as hardened steel. Some benefits, however, accrue from the use of the resilient materials described above including better noise reduction, static electricity dissipation, and lower manufacturing cost.

The device 10' is unitary in nature and has a base portion 12 and a flange portion 14. In the base portion 12 are located a pair of mounting openings 16 (extending through the narrow dimension of the device) that are sized, shaped and tapped to accept a pair of threaded mounting screws (not shown). In the flange portion 14 is located a roller conveyor shaft receiving opening 18 (also extending through the narrow dimension of the device) that is sized and shaped very slightly larger than the size and shape of the roller conveyor shaft (not shown) to be captured therein. Although this opening 18 is illustrated as having a hexagonal shape, it will, of course, be understood that the opening may have any suitable shape including round, oval, D-shaped, and the like, as is commonly experienced in the industry, and it need not, in order for the device to work, necessarily have the same size and shape as the to be captured shaft. The openings 14 and 16 for the device 10' are oriented such that they extend through the device in a substantially perpendicular manner with respect to a rear face 20 of the device. The device 10' further includes a front face 22 that, at least with respect to a portion thereof located at the flange portion 14, forms a taper 22a that narrows the device in its depth dimension (i.e., the front face surface in this region is not oriented parallel with respect to the rear face 20). In this configuration, the roller conveyor shaft receiving opening 18 is oriented at an oblique angle with respect to the tapered portion 22a of the front face 22. This tapered portion 22a of the front face 22 is best seen in FIG. 5 where the extent of the taper 22a is illustrated in a slightly exaggerated manner. Although any angle, including that illustrated, may be chosen, the angle of the taper 22a is preferably chosen in the range of between one to five degrees.

Although a pair of openings 16 are illustrated, it will be understood that only one such opening 16 is necessary. Two openings 16 (with their associated screws) provide for improved engagement of the device against a conveyor side frame and improved leverage (as will be described herein)

Figure 7:
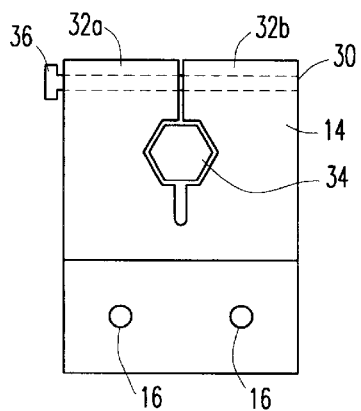
FIG. 7 is a front view of the alternative embodiment shaft capturing device shown engaged to capture a roller conveyor shaft.

The device 10' further includes a slot 26 cut through the narrower dimension of the flange portion 14 from the front face 22 to the rear face 20 in substantial alignment with, and extending through to and past the roller conveyor shaft receiving opening 18. The slot 26 defines a pair of tangs or clamping members 33a and 33b in the flange portion 14 that, due to the resilient nature of the device 10', are capable of some slight lateral movement or distortion in the direction of double-headed arrow 34. When the members 33a and 33b are displaced away from each other this allows a roller conveyor shaft 34 (see, FIG. 4) to be more easily received by the shaft opening 18. Although this shaft 34 is illustrated as having a hexagonal shape, it will, of course, be understood that the shaft may have any suitable shape including round, oval, D-shaped, and the like, as is commonly experienced in the industry, and it need not, in order for the device to work, necessarily have the same size and shape as the opening 18. When the members 33a and 33b are displaced towards each other, on the other hand, this clamps the flange portion 14 tightly around and captures the received roller conveyor shaft (reference 34 in FIG. 7). Near a top edge 28 of the device 10', an opening 30 is formed through the wide dimension of the flange portion 14 that is sized, shaped and tapped to accept a threaded locking screw (not shown). The opening 30 for the device 10' is oriented such that it extends through the wide dimension of the device substantially perpendicular to the side faces 32 of the device (and the shaft opening 18). The displacement operation for clamping a shaft is performed and controlled by the tightening and loosening action of a threaded locking screw (reference 36 in FIG. 7) that is inserted within the opening 30.

Although illustrated formed extending into the device from the top edge 28, it will be understood that the slot 26 may alternatively be formed to extend into the device from either side face 32. In this configuration (not explicitly illustrated), the opening 30 for the device 10' would be oriented such that it extends through the wide dimension of the device substantially perpendicular to the top edge 28 of the device.

Furthermore, although the opening 30 is illustrated extending through the device along the top edge 28, it will be understood that the opening may alternatively be formed below the shaft opening 18 and extending through a bottom portion of the slot 26. It is also understood that openings 30 both above and below the shaft opening 18 may be used.

At a lower portion of the shaft receiving opening 18, at or about the base of the slot 26, it may be advantageous to include a friction material 40 (illustrated generally speaking with dotted lines). The purpose of this material 40 is to act and provide a further restraint against axial displacement of the received shaft from the opening 18. One example of such a friction material 40 may comprise a thin piece of metal molded into the device. Another example may comprise one or more rubber fingers molded into the edges of the opening 18. Yet another example may comprise a roughening of the inner surfaces of the opening 18. Other options readily recognized by those skilled in the art for providing some sort of friction restraint against axial shaft displacement may also be used. Whatever material is used, however, should not interfere with the insertion of the shaft into the opening 18.

Figure 8A:
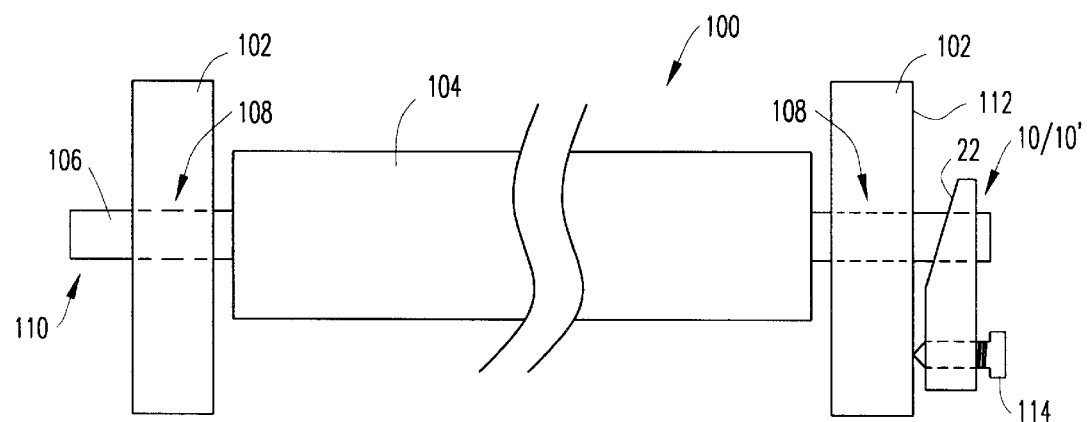
FIGS. 8A–8C illustrate use of the shaft capturing device of the present invention to recondition/repair a roller conveyor side frame.
Figure 8B:
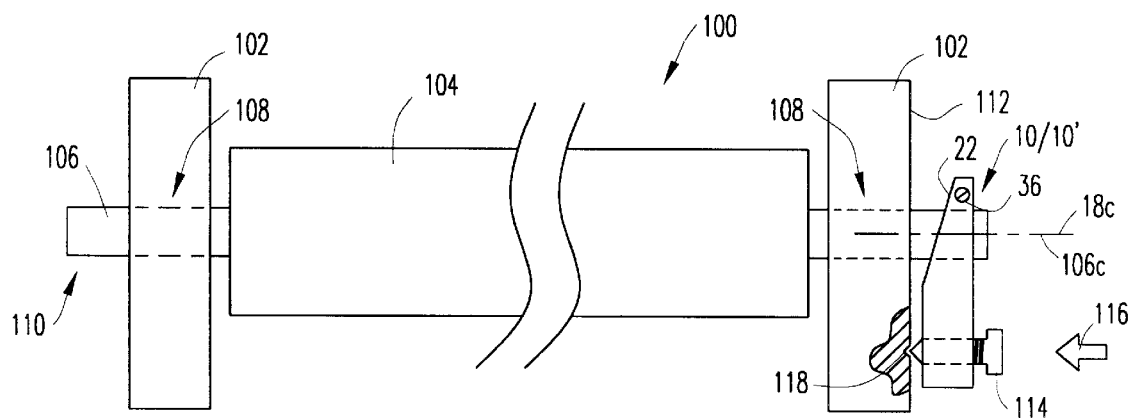
Figure 8C:
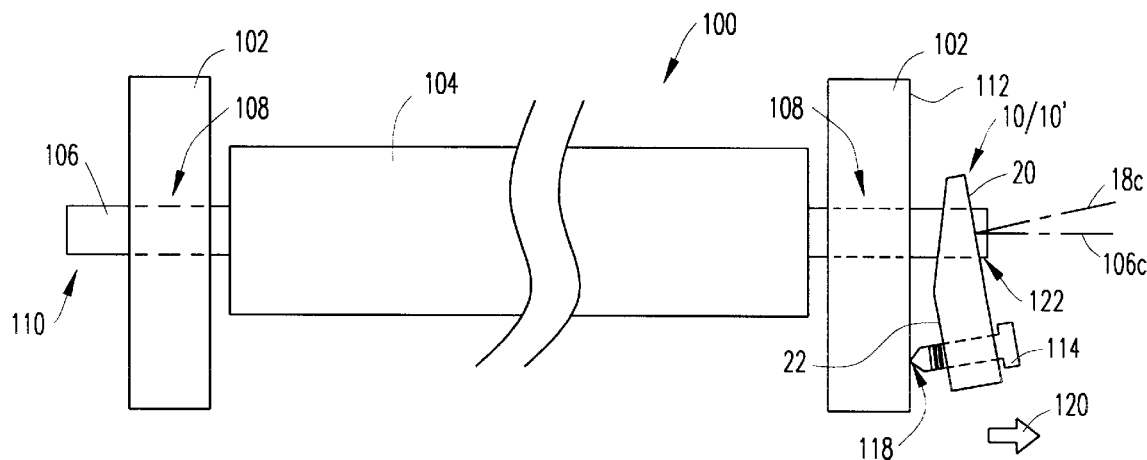

Reference is now made to FIGS. 8A–8C illustrating use of the device 10/10' of the present invention to recondition/repair a roller conveyor side frame. Roller conveyor systems typically mount a conveyor roller 100 between two parallel, longitudinally extending, side frames 102. The rollers 100 comprise an outer tubular covering 104 with a bearing mounted shaft (axle) 106 running through the middle of the roller and extending out past each roller end by several inches. Holes, slots, apertures or cut-outs (generally referred to as openings 108) are provided in each side frame 102, and the ends 110 of the conveyor roller shafts 106 are inserted in, and retained by, opposed pairs of such openings in the side frames. The rollers may then be actuated through an appropriately configured drive system (such as a motor driven belt or chain drive, not shown).

It is assumed that the opening 108 in the side frame 102 has been deformed to some degree necessitating repair. For example, a slight deformation might allow for more movement (twisting) of the shaft 106 which results in an increased noise level (rattling) and vibration caused by metal-to-metal contact of the shaft against the frame 102. With further wear, the twisting action will, over time, turn the hexagonally shaped opening 108 into a circularly shaped opening, and allow the shaft 106 to freely rotate or spin within the opening. Repair utilizing the devices 10/10' (described above) and method (to be described below) of the present invention addresses the foregoing problems and allows for continued use of the deformed side frames. As an alternative, the opening in the side frame need not necessarily have become worn, but rather could instead be incompatible (for example, in size and shape) with the retained roller shaft.

Turning now to FIG. 8A, the device 10/10' is first inserted over the shaft 106, with its front face 22 facing the outside surface 112 of the side frame 102, such that the shaft extends into (and perhaps through) the opening 18. The pair of threaded mounting screws 114 are positioned in the openings 16 of the device 10/10' such that their screw points extend slightly out past the base portion 12 front face 22 of the device.

Reference is now made to FIG. 8B. If the device 10/10' is of the embodiment illustrated in FIGS. 4–7, the threaded locking screw 36 is tightened to clamp the flange portion 14 tightly around and capture the received roller conveyor shaft 106 (see, FIG. 7). Still further, if the friction material 40 is provided at the bottom of the opening 18, it will serve to assist in holding the device to the shaft. For either embodiment of the device 10/10', pressure, preferably in the form of an impact from a hammer or mallet, is applied in the direction indicated by arrow 116 against the threaded mounting screws 114 to cause dimples 118 to be formed by the screw points in the outside surface 112 of the side frame 102. It is recognized that the use of screws 114 having hardened screw points is preferred to ensure sufficient dimple formation following the impact. It should also be recognized that a separate device (such as a punch, a screwdriver tip, or the like) may be used instead of the screw points to form each dimple 118. As yet another alternative, a screw 114 having a substantially flat point end (like that with a bolt) may be used in which case an indentation may be formed from the impact, or the action step for impacting may be obviated.

Next, in FIG. 8C, the screw points of the threaded mounting screws 114 should remain seated in the dimples 118 while the screws 114 are tightened. Tightening of the threaded mounting screws 114 causes the base portion 12 of the device 10/10' to be pushed (in the direction of arrow 120) away from the outside surface 112 of the side frame 102. This movement causes the device to rotate about a fulcrum (or pivot) point 122 (see, also, FIGS. 2, 3, 5 and 6) formed at or about the point where the shaft 106 touches the bottom edge of shaft opening 18 at about the rear face 20 of the device. Although not explicitly illustrated, it is recognized that, given the preferred resilient nature of the device 10/10', some bending along the length of the device may be experienced as the threaded mounting screws 114 are tightened and the base portion 12 moves in the direction of arrow 120. As the tightening continues, the shaft receiving opening 18 in the flange portion 14 of the device 10/10' closes (narrows) in size to tightly capture the conveyor roller shaft 106 (for example, on all six sides if hexagonal in shape). At this position, and given, for example, a hexagonal shaft and opening, the closure of the opening 18 referenced above results in the bottom half edges of the shaft 106 being captured by the bottom half surfaces of the opening at or about the location of the rear face 20 while the top half edges of the shaft are being captured by the top half surfaces of the opening at or about the location of the front face 22. This closure of the size of the shaft receiving opening 18 is graphically evidenced by a skewing in the alignment of the opening 18 centerline 18c and the shaft 106 centerline 106c (illustrated in somewhat an exaggerated fashion in FIG. 8C, and as compared to the aligned illustration in FIG. 8B). The presence of the tapered portion 22a of the front face 22 provides the space necessary for the device 10/10' to be rotated about the pivot point 122 during screw tightening without encountering resistance from the outside surface 112 of the side frame 102. The seating of the screw points in the dimples 118 (or indentations) prevents the device 10/10' from rotating or being displaced when the roller conveyer is returned to operation and the roller shaft tries to twist back and forth. In the event the flat ended screw (bolt) is used, displacement may still be prevented due to the large frictional contact surface area presented by the bolt flat end resting against the outer surface of the side frame. Still further, if the friction material 40 is present, the tightening of the screws 114 causes additional pressure and friction to be developed by the material 40 against the bottom half of the shaft 16 that will prevent axial displacement of the device from the shaft end during and following installation. As a specific example, consider the suggested thin piece of metal acting as the friction device 40. As the screws 114 are tightened, an edge of the metal friction device may dig into the outer surface of the shaft. Although not providing the same level of friction restraint, the suggested rubber fingers or roughened surface act similarly to increase the friction force as the screws 114 are tightened.

Device 10' may, in some instances, be easier to install during a repair operation than the device 10. When an installation is required in tight quarters and the repairman cannot physically hold the device 10 in place with one hand while tightening the screws 114 with the other, then it is preferred to use the device 10'. The reason for this is that the clamping operation performed by the tangs following tightening of the locking screw 36 serves to hold the device 10' onto the end of the shaft while the dimple forming impact is applied and while the threaded mounting screws 114 are subsequently tightened. Two hands would not then be required to perform the device installation, and the free hand could be put to some other beneficial use. Ease of installation of device 10 may be improved with use of the friction device 40 to help hold the device in place on the shaft end.

Figure 9:
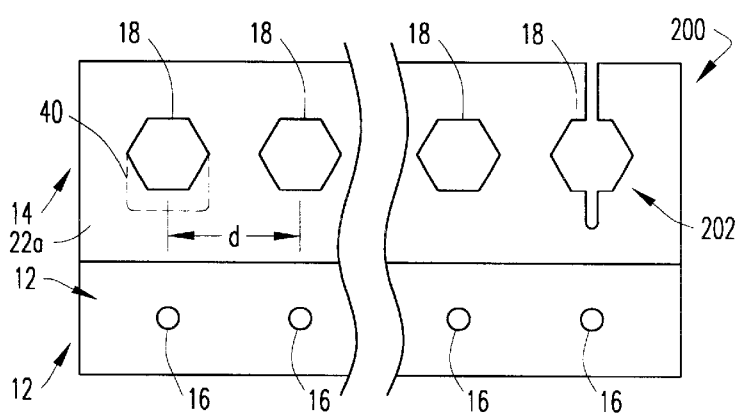
FIG. 9 is a front view of another alternative embodiment shaft capturing device in accordance with the present invention.

Reference is now made to FIG. 9 wherein there is shown a front view of another alternative embodiment shaft capturing device 200 in accordance with the present invention. In this embodiment, the device 200 in essence comprises a plurality of aligned devices 10 (see, FIGS. 1–3). The general configuration of the device 200 is substantially the same as that shown and described for the device 10 of FIGS. 1–3. The major difference between the two devices rests with the provision of multiple, spaced apart, shaft openings 18. These openings are provided with an inter-opening pitch (d) that substantially matches the distance between adjacent roller shafts in a roller conveyor assembly. While the devices 10/10' are configured to repair one worn side frame opening at a time, the device 200 is configured to simultaneously repair a plurality of adjacent worn side frame openings with one installation. This device 200 can thus be used to repair several adjacent openings on a severely damaged side frame, while the device 10/10' can be used to spot repair worn side frames on an individual opening-by-opening basis. Installation of the device 200 is accomplished in the same manner as that shown for the device 10/10' in FIGS. 8A–8C.

While primarily illustrated using the configuration of the device 10 (FIGS. 1–3), it will be understood that the multiple opening 18 device 200 of FIG. 9 may be completely configured using the slotted openings of the device 10' (FIGS. 4–7) as is generally illustrated at 202. A mixed device 200 that includes openings of the device 10 type as well as of the device 10' type is also possible.

While the primary application for the devices 10/10' and 200 of the present invention is in conjunction with the reconditioning/repair of worn roller conveyor side frames, it should be recognized by those skilled in the art that the devices of the present invention may further be used as an integral part of a preventative maintenance program for roller conveyor side frames. In accordance with this program, devices 10/10' and 200 may be installed on side frames, especially in connection with the shafts for actuation or drive rollers, to make a pre-emptory strike against the start or worsening of shaft opening wear and distortion caused by twisting of the shaft in the opening as well as control vibration.

It will also be recognized that the device of the present invention may be utilized to assist with the installation of conveyor rollers where the size and shape of the roller shaft do not substantially match the size and shape of the side frame opening. Consider, for example, a situation (as might be experienced with a retro-fit or a quick-fix repair) where a round (oval, or D-shaped) shaft is inserted into a hexagonally shaped side frame opening. The device of the present invention may be used to adequately restrain that shaft here differences in size and shape between the side frame opening and roller shaft (as well as with the device opening) are experienced.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A roller conveyor, comprising:

a pair of longitudinally extending side frames having a plurality of spaced apart openings formed therein sized to receive roller support shafts;

a plurality of rollers extending between the pair of side frames, each roller including a shaft inserted into opposed pairs of openings in the side frames; and a member having a base portion and a flange portion wherein the flange portion includes an opening sized and shaped to receive the shaft of a roller mounted within an opening of the side frame, and the base portion including a mounting opening located in the base to accept a mounting screw that when tightened pushes against and engages the side frame causing the base portion to move away from the conveyor side frame resulting in a closing in the size of the shaft receiving opening in the flange portion to tighten around the received shaft.

2. The conveyor of claim 1 wherein the tightening around the received shaft and the engaging of the side frame by the member captures the shaft in the side frame to reduce shaft vibration at the opening in the side frame.

3. The conveyor of claim 1 wherein the tightening around the received shaft and the engaging of the side frame by the repair member captures the shaft in the side frame to prevent shaft twisting within the opening in the side frame.

4. The conveyor of claim 1 wherein the member is unitarily made of a resilient material.

5. The conveyor of claim 1 wherein the shaft receiving opening in the flange portion is oriented along a first centerline and the shaft mounted within the conveyor side frame is oriented along a second centerline, the movement of base portion causing a skewing in alignment between the first and second centerlines to effectuate the closing in the size of the shaft receiving opening.

6. The conveyor of claim 1 wherein the member has a shape that tapers to narrow in its depth dimension from the base portion towards the flange portion.

7. The conveyor of claim 1 wherein the flange portion further includes:
   a slot formed passing through the flange portion shaft receiving opening to define a pair of clamping tangs; and
   an opening extending through the tangs to accept a screw that when tightened pulls the tangs together to clamp the tangs of the flange portion to the received shaft.

8. The conveyor of claim 1 wherein the flange portion further includes a plurality of openings sized and shaped to receive a corresponding plurality of shafts mounted within a corresponding plural adjacent conveyor side frame openings, the plurality of openings being spaced apart from each other with a pitch substantially matching that of the plural adjacent conveyor side frame openings.

9. The conveyor of claim 1 wherein the opening in the flange portion includes a friction device to restrain axial displacement of the roller shaft.

10. The conveyor as in claim 1 wherein the opening in the flange portion has a shape that differs from the shape of the roller shaft.

11. The conveyor as in claim 1 wherein the opening in the side frame has a shape that differs from the shape of the roller shaft.

12. A method for roller conveyor assembly, comprising the steps of:
   inserting a shaft capturing device over a roller shaft extending through a roller shaft receiving opening of a roller conveyor side frame, the shaft capturing device having a base portion and a flange portion wherein the flange portion includes an opening sized and shaped to receive the roller shaft, and the base portion includes a mounting opening located in the base to accept a mounting screw; and
   tightened the mounting screw while an end thereof rests against the side frame, the tightening action pushing against and engaging the side frame to cause the base portion to move away from the conveyor side frame resulting in a closing in the size of the shaft receiving opening in the flange portion to tighten around the received shaft.

13. The method of claim 12 further comprising the step of:
   dimpling an external surface of the side frame;
   wherein the step of tightening is performed while a point of the screw is seated in the dimple.

14. The method of claim 13 wherein the step of dimpling comprised the step of applying an impact force against the mounting screw to form the dimple in the external surface of the side frame with the mounting screw point.

15. The method of claim 12 wherein the shaft capturing device further includes a slot formed passing through the flange portion shaft receiving opening to define a pair of clamping tangs, and an opening extending through the tangs to accept a screw, the method further comprising the step of:
   tightening the screw to pull the tangs together and clamp the tangs of the flange portion to the received shaft.

16. The method of claim 15 wherein the step of tightening the screw to pull the tangs together is performed prior to the step of tightening the mounting screw.

17. A device, comprising:
   a member having a base portion and a flange portion wherein:
   the flange portion includes an opening sized to receive a roller conveyor shaft mounted within a conveyor side frame; and
   the base portion including a mounting opening located in the base to accept a mounting screw that when tightened pushes against and engages the conveyor side frame causing the base portion to move away from the conveyor side frame resulting in a closing in the size of the shaft receiving opening in the flange portion to tighten around the received shaft.

18. The device as in claim 17 wherein the member is unitarily made of a resilient material.

19. The device as in claim 17 wherein the shaft receiving opening in the flange portion is oriented along a first centerline and the roller conveyor shaft mounted within the conveyor side frame is oriented along a second centerline, the movement of base portion causing a skewing in alignment between the first and second centerlines to effectuate the closing in the size of the shaft receiving opening.

20. The device as in claim 17 wherein the member has a shape that tapers to narrow in its depth dimension from the base portion towards the flange portion.

21. The device as in claim 17 wherein the flange portion further includes:
   a slot formed passing through the flange portion shaft receiving opening to define a pair of clamping tangs; and
   an opening extending through the tangs to accept a screw that of the flange portion to the received shaft.

22. The device as in claim 17 wherein the flange portion further includes a plurality of openings sized and shaped to receive a corresponding plurality of roller conveyor shafts mounted within a corresponding plurality of openings being spaced apart from each other with a pitch substantially matching that of the plural adjacent conveyor side frame openings.

23. The device as in claim 17 wherein the opening in the flange portion includes a friction device to restrain axial displacement of the roller conveyor shaft.

* * * * *

UNITED STATES PATENT AND TRADEMARK OFFICE
CERTIFICATE OF CORRECTION

PATENT NO. : 6,481,564 B2
DATED : November 19, 2002
INVENTOR(S) : W. Scott Kalm

It is certified that error appears in the above-identified patent and that said Letters Patent is hereby corrected as shown below:

Title page, Item [54] and Column 1, lines 1 and 2,
Replace "CONVEYOR SIDE FRAME SHAFT OPENING RECONDITIONING DEVICE AND METHOD" with -- CONVEYOR SIDE FRAME SHAFT CAPTURING DEVICE AND METHOD FOR USING SAME --

Title page,
Item [57], ABSTRACT,
Line 5, replace "Amounting opening" with -- A mounting opening --

Column 10,
Line 15, replace "the step of." with -- the step of: --
Line 52, replace "that of the flange portion to the received shaft." with -- that when tightened pulls the tangs together to clamp the the tangs of the flange portion to the received shaft. --
Line 56, replace "within a corresponding plurality" with -- within a corresponding plural adjacent conveyor side frame openings, the plurality --

Signed and Sealed this

Twenty-ninth Day of July, 2003

JAMES E. ROGAN
*Director of the United States Patent and Trademark Office*